United States Patent
Kronestedt et al.

(10) Patent No.: US 10,917,900 B2
(45) Date of Patent: Feb. 9, 2021

(54) FREQUENCY LOCATION OF A PCELL

(71) Applicant: Telefonaktiebolaget LM Ericsson (publ), Stockholm (SE)

(72) Inventors: Fredric Kronestedt, Bromma (SE); Sven Ekemark, Storvreta (SE); Magnus Lundevall, Sollentuna (SE); Jacob Österling, Järfälla (SE)

(73) Assignee: Telefonaktiebolaget LM Ericsson(publ), Stockholm (SE)

( * ) Notice: Subject to any disclaimer, the term of this patent is extended or adjusted under 35 U.S.C. 154(b) by 0 days.

(21) Appl. No.: 15/758,170

(22) PCT Filed: Sep. 8, 2015

(86) PCT No.: PCT/SE2015/050945
§ 371 (c)(1),
(2) Date: Mar. 7, 2018

(87) PCT Pub. No.: WO2017/044018
PCT Pub. Date: Mar. 16, 2017

(65) Prior Publication Data
US 2018/0249475 A1   Aug. 30, 2018

(51) Int. Cl.
*H04W 72/08* (2009.01)
*H04L 5/00* (2006.01)
(Continued)

(52) U.S. Cl.
CPC .......... *H04W 72/085* (2013.01); *H04L 5/001* (2013.01); *H04L 5/0053* (2013.01); *H04W 16/32* (2013.01); *H04W 72/0453* (2013.01)

(58) Field of Classification Search
None
See application file for complete search history.

(56) References Cited

U.S. PATENT DOCUMENTS

| 7,317,897 B2 * | 1/2008 | Braun ................. H04W 52/343 455/522 |
| 2011/0098035 A1 * | 4/2011 | Frenger .............. H04W 74/006 455/423 |

(Continued)

FOREIGN PATENT DOCUMENTS

| CN | 101668319 A | 3/2010 |
| CN | 101686534 A | 3/2010 |

(Continued)

OTHER PUBLICATIONS

Autonomous Component Carrier Selection: Interference Management in Local Area Environments for LTE-Advanced by Luis G.U. Garcia et al., Aalborg University—2009.

(Continued)

*Primary Examiner* — James P Duffy
(74) *Attorney, Agent, or Firm* — Baker Botts, LLP

(57) ABSTRACT

There is provided mechanisms for determining frequency location of a primary cell (PCell) for a wireless device in a carrier aggregation supported communications network having access to a group of low frequency bands and a group of high frequency bands. A method is performed by a network node. The method comprises acquiring an uplink load level for the group of low frequency bands. The method comprises acquiring a pathloss level between a wireless device served by the communications network and the network node. The method comprises selecting, from the acquired uplink load level and pathloss level, which one of the group of low frequency bands and the group of high frequency bands to place the frequency location of the PCell for the wireless device.

22 Claims, 4 Drawing Sheets

(51) Int. Cl.
 H04W 16/32 (2009.01)
 H04W 72/04 (2009.01)

(56) References Cited

U.S. PATENT DOCUMENTS

| | | |
|---|---|---|
| 2012/0106404 A1 | 5/2012 | Damnjanovic |
| 2013/0142113 A1 | 6/2013 | Fong et al. |
| 2013/0182649 A1 | 7/2013 | Kwon et al. |
| 2014/0161058 A1 | 6/2014 | Sundaresan et al. |
| 2015/0011236 A1 | 1/2015 | Kazmi et al. |
| 2017/0026963 A1* | 1/2017 | Zhang ............... H04W 72/0446 |

FOREIGN PATENT DOCUMENTS

| | | |
|---|---|---|
| CN | 103686895 A | 3/2014 |
| CN | 103718623 A | 4/2014 |
| EP | 2 427 009 A1 | 7/2012 |
| EP | 2 566 246 A2 | 3/2013 |
| WO | 2014 063542 A1 | 5/2014 |

OTHER PUBLICATIONS

PCT International Search Report for International application No. PCT/SE2015/050945—dated Apr. 19, 2016.
PCT Written Opinion of the International Searching Authority for International application No. PCT/SE2015/050945—dated Apr. 19, 2016.
Chinese Office Action issued for Application No. 201580082996.8—dated Apr. 21, 2020.
Chinese Search Report issued for Application No. 2015800829968.8—dated Apr. 21, 2020.

* cited by examiner

FREQUENCY LOCATION OF A PCELL

PRIORITY

This nonprovisional application is a U.S. National Stage Filing under 35 U.S.C. § 371 of International Patent Application Serial No. PCT/SE2015/050945 filed Sep. 8, 2015, and entitled "FREQUENCY LOCATION OF A PCELL."

TECHNICAL FIELD

Embodiments presented herein relate to a method, a network node 200, a computer program, and a computer program product for determining frequency location of a primary serving cell (PCell).

BACKGROUND

In communications networks, there may be a challenge to obtain good performance and capacity for a given communications protocol, its parameters and the physical environment in which the communications network is deployed.

For example, to cope with increasing mobile traffic capacity demands and higher expectations for better user experience, operators have started to deploy multiple frequency carriers in radio access network nodes. In wireless technologies, such as the long term evolution (LTE) telecommunications standards, multiple frequency carriers can be assigned from both low frequency bands (e.g. 700-900 MHz) and high frequency bands (e.g. 1800-3500 MHz). For next generation wireless technologies even higher frequency bands are being considered (e.g. up to 100 GHz). The bandwidth is usually limited in the low frequency bands compared to the high frequency bands. Common allocations include e.g. 10 MHz in the low frequency bands and e.g. 20 MHz in the high frequency bands for an operator. It is also common that an operator has allocations from both low frequency bands and high frequency bands. The low frequency bands are well suited for high range coverage and indoor coverage due to better propagation characteristics than the high frequency bands, whilst the high frequency bands have shorter range coverage but can provide higher capacity than the low frequency bands due to the larger bandwidth. Carrier aggregation (CA) can be used in the downlink (i.e., transmission from radio access network node to wireless device) to aggregate carriers in order to increase bandwidth when scheduling data for a wireless device. Carrier aggregation can also be used in uplink. Mobile broadband services are downlink heavy since multimedia services, such as streaming video services, are growing in popularity. Downlink services based on the Transmission Control Protocol (TCP) requires feedback from the wireless device; otherwise there can be no downlink throughput and service will degrade.

The LTE Rel-10 specifications have been standardized. The LTE Rel-10 specifications provide support for so-called Component Carrier (CC) bandwidths up to 20 MHz (which is the maximum LTE Rel-8 carrier bandwidth). An LTE Rel-10 operation wider than 20 MHz is possible and appear as a number of LTE CCs to an LTE Rel-10 supporting wireless device. One way to obtain bandwidths wider than 20 MHz is by means of Carrier Aggregation (CA). CA implies that an LTE Rel-10 supporting wireless device is able to receive multiple CCs, where the CCs have, or at least the possibility to have, the same structure as a Rel-8 carrier. CA is illustrated in FIG. 6. FIG. 6 schematically illustrates an aggregated bandwidth 610 along which component carriers 620a, 620b, . . . , 620n are placed. The aggregated bandwidth 610 may for example be 100 MHz and each component carrier 620a, 620b, . . . , 620n may occupy a bandwidth 20 MHz.

The Rel-10 specifications provide support for up to five aggregated CCs where each CC is limited in the radio frequency (RF) specifications to have one of six available bandwidths, namely 6, 15, 25, 50, 75 or 100 resource blocks (RB), corresponding to bandwidths of 1.4, 3 5 10 15 and 20 MHz, respectively.

The number of aggregated CCs as well as the bandwidth of the individual CCs may be different for uplink (i.e., transmission from wireless device to radio access network node) and downlink. A symmetric configuration refers to the case where the number of CCs in downlink (DL) and uplink (UL) is the same whereas an asymmetric configuration refers to the case that the number of CCs is different in DL and UL. The number of CCs configured in the communications network may be different from the number of CCs seen by a wireless device; a wireless device may, for example, support more downlink CCs than uplink CCs, even though the communications network offers the same number of uplink and downlink CCs.

CCs are also referred to as cells or serving cells. More specifically, in an LTE network the cells aggregated by a wireless device are denoted primary Serving Cell (PCell) and secondary Serving Cells (SCells). The term serving cell is defined to encompass both PCell and SCells. All wireless devices have one PCell. Which cell is the PCell for a wireless device is wireless device specific. The PCell is, from a signalling perspective, considered more important than the SCells; vital control signaling and other important signaling is typically handled via the PCell. Uplink control signaling is currently always sent on the PCell. The component carrier configured as the PCell is the Primary CC (PCC) whereas all other component carriers configured as the SCells are Secondary (SCC). The wireless device can send and receive data both on the PCell and SCells. Some control signaling, such as scheduling commands, could either be configured to only be transmitted and received on the PCell but where the commands are also valid for the SCell, or can be configured to be transmitted and received on both the PCell and the SCells. Regardless of the mode of operation, the wireless device will only need to read the broadcast channel in order to acquire system information parameters on the PCC. System information related to SCC may be provided to the wireless device in dedicated Radio Resource Control (RRC) messages.

During initial access an LTE Rel-10 supporting wireless device behaves similar to a LTE Rel-8 supporting wireless device. However, upon successful connection to the network a Rel-10 supporting wireless device may—depending on its own capabilities and the capabilities of the network—be configured with additional serving cells in the UL and/or DL. Configuration is based on RRC. Due to the heavy signaling and rather slow speed of the RRC signaling it is envisioned that a wireless device may be configured with multiple serving cells, even though not all of them are currently used.

Different deployment scenarios for carrier aggregation in relation to frequency bands and the placement of cells within frequency bands are shown at (a), (b), and (c) in FIG. 7. FIG. 7 schematically illustrates a group of low frequency bands 710a, 710b, 710c, a group of high frequency bands 720a, 720b, 720c, and a group of mid frequency bands 730a, 730b, 730c. The groups of low frequency bands 710b, 710c further comprises a further group of low frequency bands 710ba, 710*ca* and a further group of high frequency bands 710*bb*, 710*cb*. There are different ways to place cells (PCell or SCell) 740*a*, 740*b*, 740*c* in the frequency bands. The different variants are intra-band aggregation, contiguous cells as in (b), intra-band aggregation, non-contiguous cells as in (c), and inter-band aggregation as in (a).

To summarize, LTE CA supports efficient use of multiple carriers, allowing data to be sent and/or received over all carriers. There is support for cross-carrier scheduling avoiding the need for the wireless device to listen to all carrier-scheduling channels all the time. This mechanism relies on tight time synchronization between the carriers.

An issue with deploying multiple frequency carriers to radio access network nodes is that different frequency bands have different performance characteristics. This is especially seen for wireless devices located at large distances from the serving radio access network node or at indoor locations with high pathloss to the serving radio access network node. FIG. 8 shows the uplink cell edge throughput (5:th percentage) for simulations of a low frequency band (900 MHz) and a high frequency band (2600 MHz). It can be seen that the high frequency band offers no throughput at the cell edge in this scenario. The low frequency band offers better throughput but may on the other hand suffer from increased interference as the load increases (as represented by the increased curve slope) due to better propagation characteristics in this frequency band.

There is hence a need for providing a reliable uplink in deployments with more than one available frequency band.

SUMMARY

A particular object of embodiments herein is therefore to provide a reliable uplink in deployments with more than one available frequency band.

The inventors of the herein disclosed embodiments have realized that, with carrier aggregation, selecting what frequency band to use as PCell is important as it carries uplink signaling. Selecting e.g., the PCell to be located at 2600 MHz as in the scenario from FIG. 8 can result in unsatisfactory downlink performance since the uplink performance at the high frequency band is very poor. Commonly, the PCell is placed in the low frequency band. However, the inventors of the herein disclosed embodiments have further realized that an issue with always selecting the low frequency band for the PCell is that the low frequency band can become overloaded and suffer from high interference with degraded performance as a result.

A particular object of embodiments herein is therefore to provide efficient determination of frequency location of the PCell for a wireless device.

According to a first aspect there is presented a method for determining frequency location of a primary cell (PCell) for a wireless device in a carrier aggregation supported communications network having access to a group of low frequency bands and a group of high frequency bands. The method is performed by a network node. The method comprises acquiring an uplink load level for the group of low frequency bands. The method comprises acquiring a pathloss level between a wireless device served by the communications network and the network node. The method comprises selecting, from the acquired uplink load level and pathloss level, which one of the group of low frequency bands and the group of high frequency bands to place the frequency location of the PCell for the wireless device.

Advantageously this provides reliable uplink in deployments with more than one available frequency band.

Advantageously this provides efficient determination of frequency location of the PCell for the wireless device.

Advantageously this enables improved uplink reliability, throughput and capacity compared to traditional mechanisms.

Advantageously this enables better carrier aggregation and downlink performance than traditional mechanisms since the PCell is selected such that uplink signaling (using the PCell) can be secured.

According to a second aspect there is presented a network node for determining frequency location of a PCell for a wireless device in a carrier aggregation supported communications network having access to a group of low frequency bands and a group of high frequency bands. The network node comprises processing circuitry. The processing circuitry is configured to cause the network node to perform a set of operations. The processing circuitry is configured to cause the network node to acquire an uplink load level for the group of low frequency bands. The processing circuitry is configured to cause the network node to acquire a pathloss level between a wireless device served by the communications network and the network node. The processing circuitry is configured to cause the network node to select, from the acquired uplink load level and pathloss level, which one of the group of low frequency bands and the group of high frequency bands to place the frequency location of the PCell for the wireless device.

According to a third aspect there is presented a network node for determining frequency location of a PCell for a wireless device in a carrier aggregation supported communications network having access to a group of low frequency bands and a group of high frequency bands. The network node comprises processing circuitry. The network node comprises a computer program product. The computer program product stores instructions that, when executed by the processing circuitry, causes the network node to perform a method according to the first aspect.

According to a fourth aspect there is presented a computer program for determining frequency location of a PCell for a wireless device, the computer program comprising computer program code which, when run on a network node, causes the network node to perform a method according to the first aspect.

According to a fifth aspect there is presented a computer program product comprising a computer program according to the fourth aspect and a computer readable medium on which the computer program is stored.

It is to be noted that any feature of the first, second, third, fourth and fifth aspects may be applied to any other aspect, wherever appropriate. Likewise, any advantage of the first aspect may equally apply to the second, third, fourth, and/or fifth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
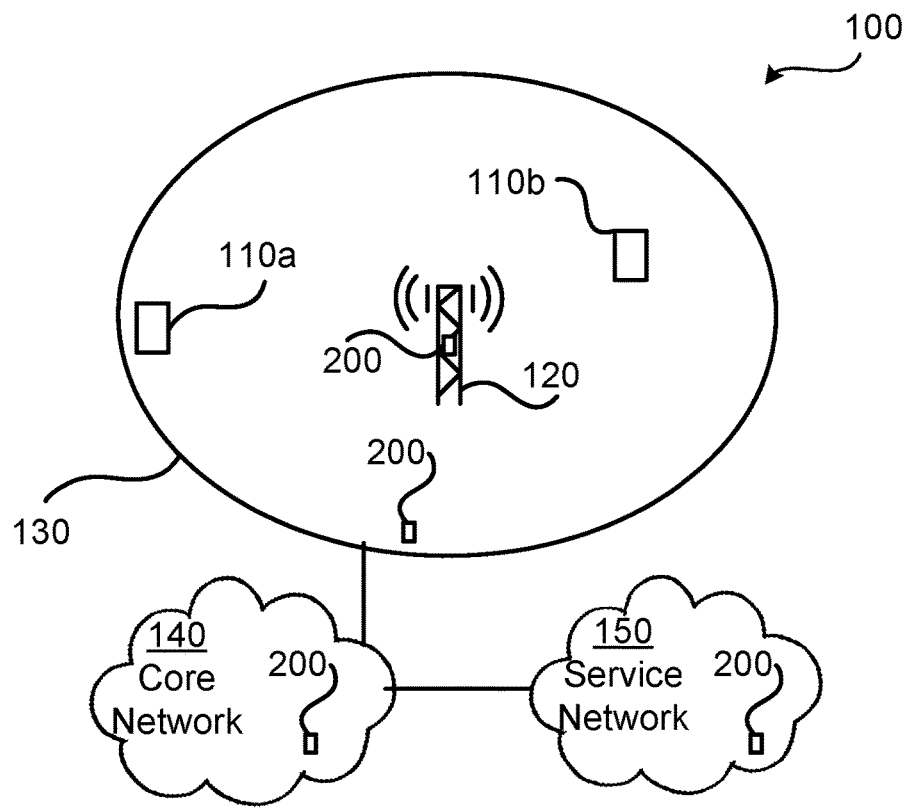
FIG. 1 is a schematic diagram illustrating a communication network according to embodiments.

FIG. 1 is a schematic diagram illustrating a communications network 100 where embodiments presented herein can be applied. The communications network 100 comprises radio access network nodes 120 configured to provide network coverage to wireless devices 110a, 110b in a cell 130. As understood by the skilled person the communications network 100 may comprise a plurality of such radio access network nodes 120, each providing network coverage to wireless devices 110a, 110b in its own cell. The radio access network nodes 120 may be provided as any combination of radio base stations, base transceiver stations, node Bs, evolved node Bs, or other wireless access points. The wireless devices 110a, 110b may be provided as any combination of mobile stations, mobile phones, handsets, wireless local loop phones, user equipment (UE), smartphones, laptop computers, tablet computers, wireless modems, and network equipped sensors.

The radio access network nodes 120 are operatively connected to a core network 140 which in turn is operatively connected to s service network 150. The wireless devices 110a, 110b are thereby enabled to access services and exchange data with the service network 150. The communications network 100 further comprises at least one network node 200. FIG. 1 schematically illustrates different locations of the network node 200. For example, a network node 200 may be located in a radio access network node 120, as a separate entity in a radio access network as defined by the radio access network nodes 120, as an entity in the core network 140 and/or as an entity in the service network 150. Further description of the network node 200 will be provided below.

Figure 7:
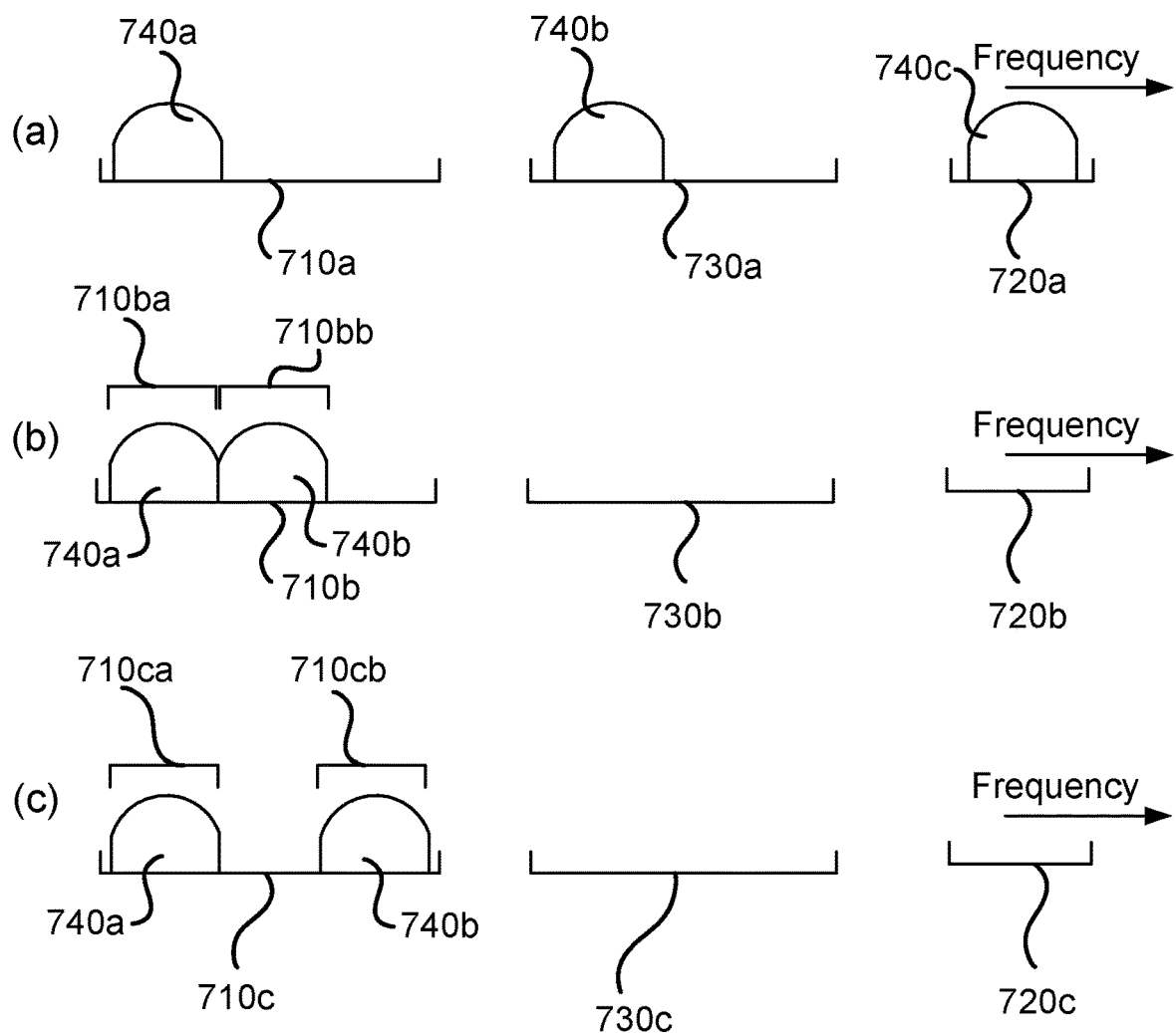
FIG. 7 schematically illustrates examples of carrier aggregation.

The communications network 100 is assumed to support carrier aggregation having access to at least a group of low frequency bands 710a, 710b, 710c and a group of high frequency bands 720a, 720b, 720c, see FIG. 7 as described above. In a radio access network node 120 supporting carrier aggregation using multiple frequency bands (such as a group of low frequency bands 710a, 710b, 710c and a group of high frequency bands 720a, 720b, 720c), there may be different ways to select the frequency location of the PCell (740a, 740b, or 740c). In general terms, carrier aggregation can be regarded as a special case of dual connectivity where, for example, one network node 200 is configured to support communications on a first group of frequency bands when communicating with a wireless device 110a, 110b and where another network node 200 is configured to support communications on a second group of frequency bands when communicating with the same wireless device 110a, 110b. Hence, the terms carrier aggregation and dual connectivity may be used interchangeably throughout this disclosure.

The embodiments disclosed herein relate to such determination of the frequency location of a PCell for the wireless device 110a, 110b. In order to obtain such determination there is provided a network node 200, a method performed by the network node 200, a computer program comprising code, for example in the form of a computer program product, that when run on a network node 200, causes the network node 200 to perform the method.

Figure 2A:
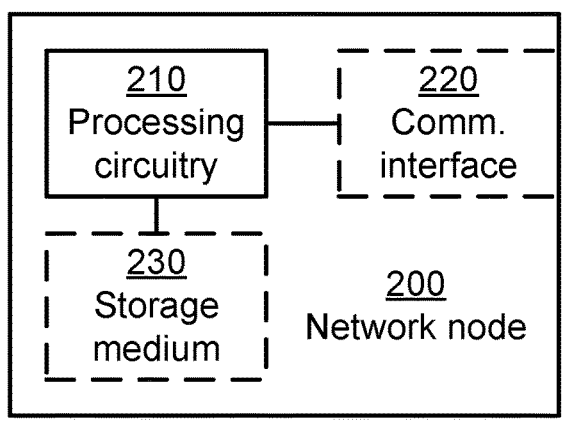
FIG. 2a is a schematic diagram showing functional units of a network node according to an embodiment.

FIG. 2a schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 310 (as in FIG. 3), e.g. in the form of a storage medium 230.

Particularly, the processing circuitry 210 is configured to cause the network node 200 to perform a set of operations, or steps, S102-S112. These operations, or steps, S102-S112 will be disclosed below. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 for communications with at least one wireless device 110a, 110b, another network node 200 as well as nodes, devices, and entities in the core network 140 or the service network 150. As such the communications interface 220 may comprise one or more transmitters and receivers, comprising analogue and digital components and a suitable number of antennas for wireless communications and ports for wireline communications. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 2B:
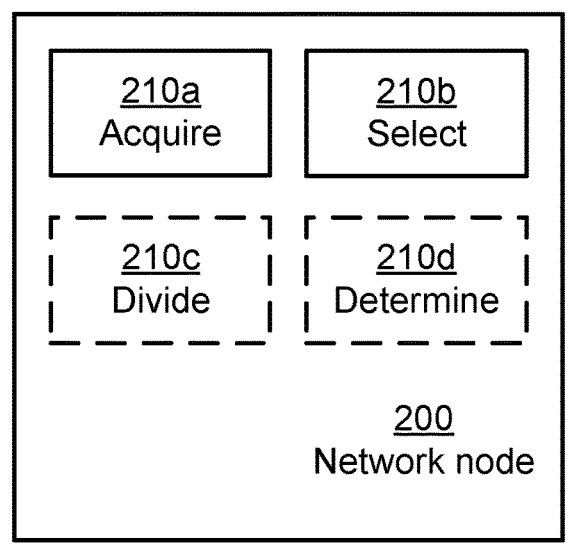
FIG. 2b is a schematic diagram showing functional modules of a network node according to an embodiment.

FIG. 2b schematically illustrates, in terms of a number of functional modules 210a-210d, the components of a network node 200 according to an embodiment. The functionality of each functional module 210a-210d will be further disclosed below in the context of which the functional modules 210a-210d may be used. The network node 200 of FIG. 2b comprises an acquire module 210a configured to perform below steps S102, S104, S106, and a select module 210b configured to perform below step S108. The network node 200 of FIG. 2b may further comprises a number of optional functional modules, such as any of a divide module 210C configured to perform below step S110, and/or a determine module 210d configured to perform below step S112. In general terms, each functional module 210a-210d may in one embodiment be implemented only in hardware or and in another embodiment with the help of software, i.e., the latter embodiment having computer program instructions stored on the storage medium 230 which when run on the processing circuitry makes the network node 200 perform the corresponding steps mentioned above in conjunction with FIG. 2b. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with functional units 220 and/or 230. The processing circuitry 210 may thus be configured to from the storage medium 230 fetch instructions as provided by a functional module 210a-210d and to execute these instructions, thereby performing any steps as will be disclosed hereinafter.

The network node 200 may be provided as a standalone device or as a part of at least one further device. For example, the network node 200 may be provided in a node of the radio access network (such as in a radio access network node 120) or in a node of the core network 140 or in a node of the service network 150. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell 130 than instructions that are not required to be performed in real time. In this respect, at least part of the network node 200 may reside in the radio access network, such as in the radio access network node 120, for cases when embodiments as disclosed herein are performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 2a the processing circuitry 210 may be distributed among a plurality of devices, or nodes. The same applies to the functional modules 210a-210d of FIG. 2b and the computer program 320 of FIG. 3 (see below).

Figure 3:
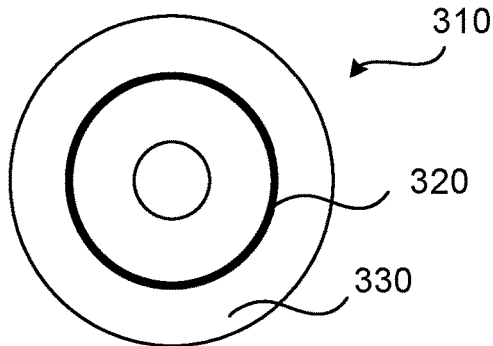
FIG. 3 shows one example of a computer program product comprising computer readable medium according to an embodiment.

FIG. 3 shows one example of a computer program product 310 comprising computer readable medium 330. On this computer readable medium 330, a computer program 320 can be stored, which computer program 320 can cause the processing circuitry 210 and thereto operatively coupled entities and devices, such as the communications interface 220 and the storage medium 230, to execute methods according to embodiments described herein. The computer program 320 and/or computer program product 310 may thus provide means for performing any steps as herein disclosed.

In the example of FIG. 3, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

Figure 4:
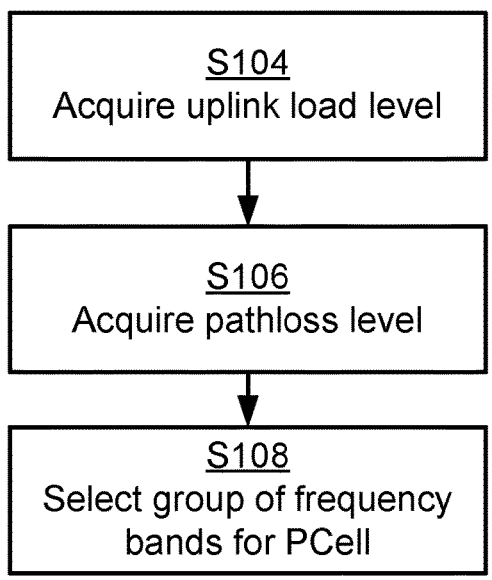
FIGS. 4 and 5 are flowcharts of methods according to embodiments.
Figure 5:
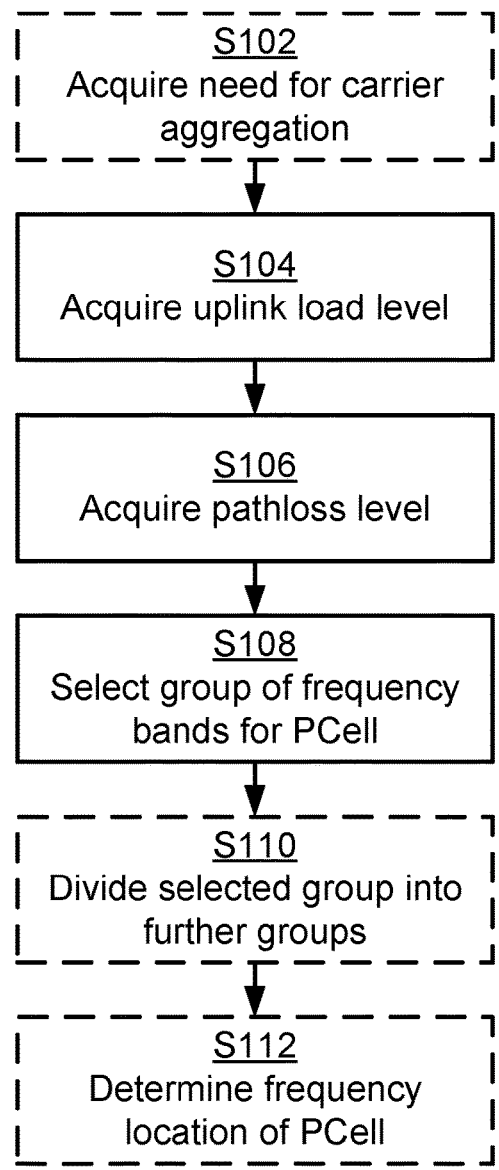
Figure 6:
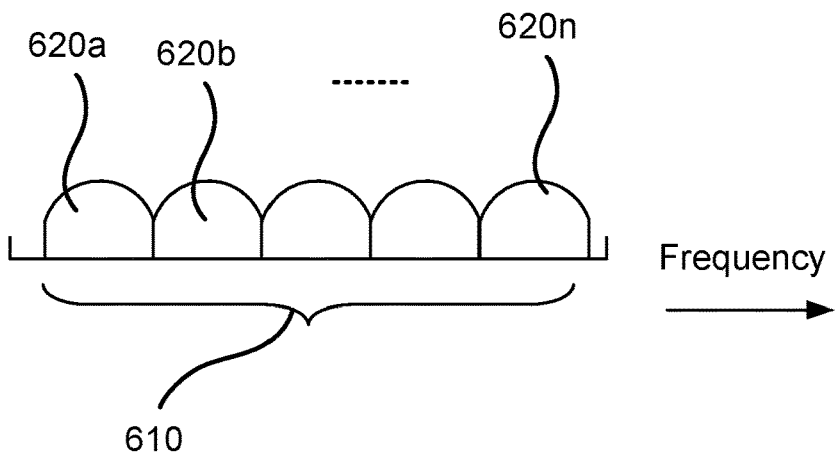
FIG. 6 schematically illustrates an example of carrier aggregation.

FIGS. 4 and 5 are flow chart illustrating embodiments of methods for determining frequency location of a PCell. The methods are performed by the network node 200. The methods are advantageously provided as computer programs 320.

Reference is now made to FIG. 4 illustrating a method for determining frequency location of a PCell for the wireless device 110a, 110b as performed by the network node 200 according to an embodiment. Continued references are made to FIGS. 1, 2a, 2b, and 7.

The frequency location of the PCell for the wireless device 110a, 110b is determined in a carrier aggregation supported communications network 100 where access is enabled to at least a group of low frequency bands 710a, 710b, 710c and a group of high frequency bands 720a, 720b, 720c.

The frequency location of the PCell is at least based on uplink load level and pathloss level. The network node 200 is therefore configured to, in a step S104, acquire an uplink load level for the group of low frequency bands 710a, 710b, 710c. In this respect the acquire module 210a may comprise instructions that when executed by the network node 200 causes the processing circuitry 210, possible in conjunction with the communications interface 220 and the storage medium 230, to acquire the uplink load level in order for the network node 200 to perform step S104. Examples of how the uplink load level may be measured will be provided below.

Further, the network node 200 is configured to, in a step S106, acquire a pathloss level between the wireless device 110a, 110b served by the communications network 100 and the network node 200. In this respect the acquire module 210a may comprise instructions that when executed by the network node 200 causes the processing circuitry 210, possible in conjunction with the communications interface 220 and the storage medium 230, to acquire the pathloss in order for the network node 200 to perform step S106. Examples of how the pathloss level may be measured will be provided below.

The network node 200 is then configured to, in a step S108, select, from the acquired uplink load level and pathloss level, which one of the group of low frequency bands 710a, 710b, 710c and the group of high frequency bands 720a, 720b, 720c to place the frequency location of the PCell for the wireless device 110a, 110b in. In this respect the select module 210b may comprise instructions that when executed by the network node 200 causes the processing circuitry 210 to select the group in order for the network node 200 to perform step S108. Examples of how the group in which the frequency location of the PCell is placed will be provided below.

Embodiments relating to further details of determining frequency location of a PCell for the wireless device 110a, 110b will now be disclosed.

There may be different examples of uplink load level. For example, the uplink load level may represent an uplink interference level, an uplink resource utilization level, an uplink traffic throughput level, or any combination thereof.

There may be different examples of how the uplink load level may be measured. For example, a measure of the uplink load level can be how many of the available uplink radio resources that are occupied. That is, the uplink load level may represent the number of available uplink radio resources in the group of low frequency bands 710a, 710b, 710c that are occupied. Further, the uplink load level may be determined based on uplink throughput statistics in the communications network 100.

The uplink load level may be measured for an uplink control channel and/or uplink data channel, such as an uplink data channel used for transmission of acknowledgement messages. One example of acknowledgement messages is TCP acknowledgement messages; both ACKs and NACKs. That is, the uplink load level may be for an uplink control channel, an uplink data channel used for transmission of acknowledgement messages, or any combination thereof.

There may be different examples of pathloss levels to be considered. For example, the pathloss can be estimated by the network node 200 in the uplink or from downlink measurements reports received from the wireless device 110a, 110b. That is, the pathloss level may be derived from uplink measurements, downlink measurements reports received from the wireless device 110a, 110b, or any combination thereof. Further, the pathloss may be estimated during a handover evaluation process. That is, the downlink measurements report may be part of a handover evaluation process of the wireless device 110a, 110b or measurements may be triggered separately.

The pathloss level may be determined for the group of low frequency bands 710a, 710b, 710c, from the group of high frequency bands 720a, 720b, 720c, or any combination thereof.

There may be different ways to determine which frequency bands to include in the group of low frequency bands 710a, 710b, 710c and which frequency bands to include in the group of high frequency bands 720a, 720b, 720c. According to an embodiment, frequency bands located lower than 1 GHz belong to the group of low frequency bands 710a, 710b, 710c and frequency bands located at 1 GHz or higher belong to the group of high frequency bands 720a, 720b, 720c. However, as the skilled person understands, this frequency threshold between the group of low frequency bands 710a, 710b, 710c and the group of high frequency bands 720a, 720b, 720c may be set differently, for example depending on which frequency bands that are available. According to another embodiment the threshold frequency to separate the group of low frequency bands 710a, 710b, 710c from the group of high frequency bands 720a, 720b, 720c is set higher, such as between 1 GHz and 1700 MHz or even higher, such as between 1700 MHz and 2600 MHz.

For example, the carrier aggregation supported communications network 100 may further comprise a group of mid frequency bands 730a, 730b, 730c and hence there may be two frequency thresholds in order to separate the group of mid frequency bands 730a, 730b, 730c from the group of low frequency bands 710a, 710b, 710c and the group of high frequency bands 720a, 720b, 720c. In some embodiment each frequency band in the group of mid frequency bands 730a, 730b, 730c is merged with one of the group of low frequency bands 710a, 710b, 710c and the group of high frequency bands 720a, 720b, 720c, respectively. In other embodiments this group of mid frequency bands 730a, 730b, 730c is discarded when selecting the frequency location for the PCell. Further, as will be further disclosed below, a group of frequency bands may in turn be split into two (sub-)groups of frequency bands.

There may be different ways for the network node 200 to select, from the acquired uplink load level and pathloss level, which one of the group of low frequency bands 710a, 710b, 710c and the group of high frequency bands 720a, 720b, 720c to place the frequency location of the PCell for the wireless device 110a, 110b in, as in step S108. Different embodiments relating thereto will now be described in turn.

According to one embodiment, as long as the uplink load level of the group of low frequency bands 710a, 710b, 710c is below a first predetermined level, the group of low frequency bands 710a, 710b, 710c is used as PCell in the communication with the wireless device 110a, 110b. That is, the frequency location of the PCell may be selected to be in the group of low frequency bands 710a, 710b, 710c if the uplink load level for the group of low frequency bands 710a, 710b, 710c is below a first predetermined level.

According to one embodiment, when the uplink load level of the group of low frequency bands 710a, 710b, 710c exceeds the first predetermined level, also the pathloss between the wireless device 110a, 110b and radio access network node 120 is considered in the PCell selection. That is, the frequency location of the PCell may be selected based only on the pathloss level but no longer on the uplink load level if the uplink load level for the group of low frequency bands 710a, 710b, 710c is above the first predetermined level. That is, the uplink load level no longer considered in the selection of the frequency location of the PCell when it has been established that the uplink load level is above the first predetermined level.

According to one embodiment, if the pathloss is below a second predetermined limit, the group of high frequency bands 720a, 720b, 720c is selected as PCell. That is, the frequency location of the PCell may be selected to be in the group of high frequency bands 720a, 720b, 720c if the pathloss level is below the second predetermined level.

According to one embodiment, the group of low frequency bands 710a, 710b, 710c is selected as PCell if the pathloss is above the second predetermined limit. That is, the frequency location of the PCell may be selected to be in the group of low frequency bands 710a, 710b, 710c if the pathloss level is above the second predetermined level.

According to one embodiment, the PCell is randomly selected between the the group of low frequency bands 710a, 710b, 710c and the group of high frequency bands 720a, 720b, 720c if the pathloss is below the second predetermined limit. That is, the frequency location of the PCell may be randomly selected between the group of high frequency bands 720a, 720b, 720c and the group of low frequency bands 710a, 710b, 710c if the pathloss level is below a second predetermined level.

There may be different ways to determine the first predetermined level and the second predetermined level, respectively. Different embodiments relating thereto will now be described in turn.

According to one embodiment the first predetermined level is selected, or tuned, based on uplink performance statistics; medium or average throughput or any other percentile of throughput, over many load situations, depending on the desired target (e.g. cell edge or median throughput). That is, the first predetermined level may be based on uplink performance statistics in the communications network 100.

According to one embodiment the second predetermined limit is determined, or tuned, in a similar way as the first predetermined limit by observing and analyzing uplink performance statistics whilst varying the second predetermined limit. This determination, or tuning, is not load dependent. That is, the second predetermined level may be based on uplink performance statistics in the communications network 100.

Reference is now made to FIG. 5 illustrating methods for determining frequency location of the PCell for the wireless device 110a, 110b as performed by the network node 200 according to further embodiments. Continued references are made to FIGS. 1, 2a, 2b, and 7.

There may be different ways for the network node 200 to determine when to determine the frequency location of the PCell for the wireless device 110a, 110b. For example, the network node 200 may be configured to, in a step S102, acquire a need for carrier aggregation for the wireless device 110a, 110b. In this respect the acquire module 210a may comprise instructions that when executed by the network node 200 causes the processing circuitry 210, possible in conjunction with the communications interface 220 and the storage medium 230, to acquire the need for carrier aggregation in order for the network node 200 to perform step S102. The uplink load level may then be acquired in response thereto.

There are different examples of needs that the network node 200 can acquire in step S102. For example, the need may represent an indication that the amount of buffered data in the network node 200 is higher than a third predetermined level, an indication that the wireless device 110a, 110b is in active mode, an indication that the wireless device 110a, 110b supports carrier aggregation, that uplink performance is below a fourth predetermined level, or any combination thereof. The third predetermined level and the fourth predetermined level may be determined so as to tune the performance of the determination of the frequency location of the PCell for the wireless device 110a, 110b according to network demands as well as operator demands; too frequent performance of the determination of the frequency location of the PCell for the wireless device 110a, 110b may result in an unstable communications network 100, whilst too seldom performance may result in available network resources, such as carrier aggregation, are not utilized.

Further, the determination of the frequency location of the PCell for the wireless device 110a, 110b may be performed either during CA (carrier aggregation) use or before CA is to be used (as part of setting up CA). That is, the step of selecting which of the group of low frequency bands 710a, 710b, 710c and the group of high frequency bands 720a, 720b, 720c to place the frequency location of the PCell may be performed during ongoing carrier aggregation of the wireless device 110a, 110b, or as part of setting up carrier aggregation for the wireless device 110a, 110b.

The determination of the frequency location of the PCell for the wireless device 110a, 110b may be performed in an iterative manner. That is, according to one embodiment the group of frequency bands in which the frequency location of the PCell is placed is iteratively selected.

One example of such an iterative procedure for selecting the frequency location of the PCell for the wireless device 110a, 110b will now be described. However, as the skilled person understands, there may be other iterative procedures for selecting the frequency location of the PCell for the wireless device 110a, 110b. In brief, the selected group of frequency bands (as selected in step S108) may in turn divided into a new group of low frequency bands and new group of high frequency bands.

In more detail, the network node 200 may be configured to, in a step S110, divide the selected group of frequency bands in which the frequency location of the PCell has been placed into a further group of low frequency bands (710ba or 710ca) and a further group of high frequency bands (710bb, or 710cb). In this respect the divide module 210c may comprise instructions that when executed by the network node 200 causes the processing circuitry 210 to divide these selected group of frequency bands in order for the network node 200 to perform step S110. The network node 200 may then be configured to, in a step S112, determine, from the acquired uplink load level and pathloss level, the frequency location of the PCell to be in either the further group of low frequency bands (710ba, or 710ca) or the further group of high frequency bands (710bb, or 710cb). In this respect the determine module 210d may comprise instructions that when executed by the network node 200 causes the processing circuitry 210 to determine, from the acquired uplink load level and pathloss level, the frequency location of the PCell in order for the network node 200 to perform step S112.

Figure 8:
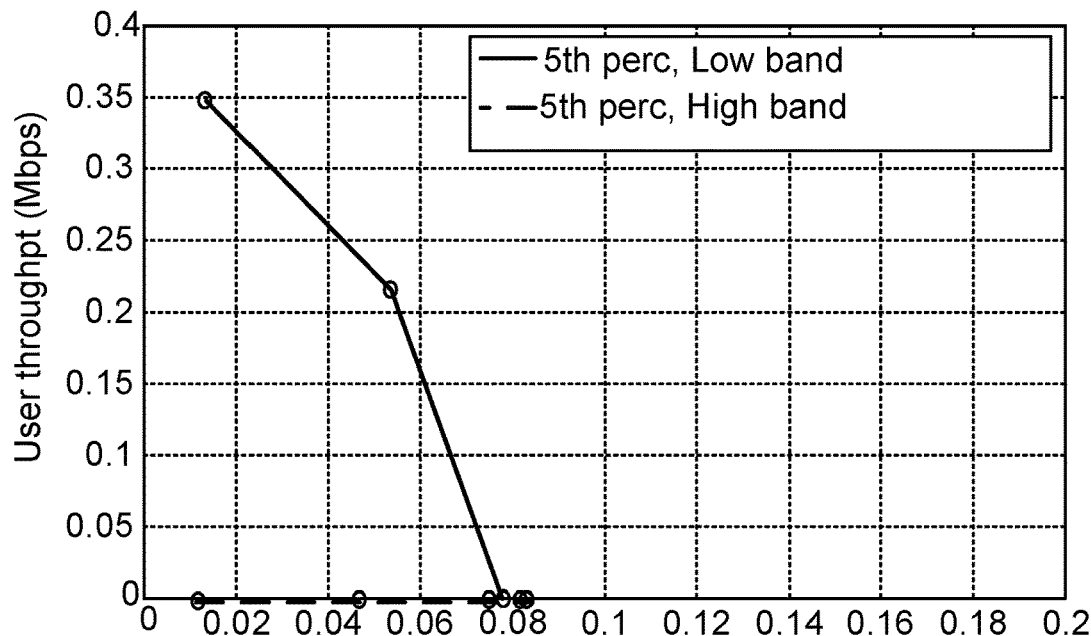
FIG. 8 schematically illustrates simulation results according to prior art.
Figure 9:
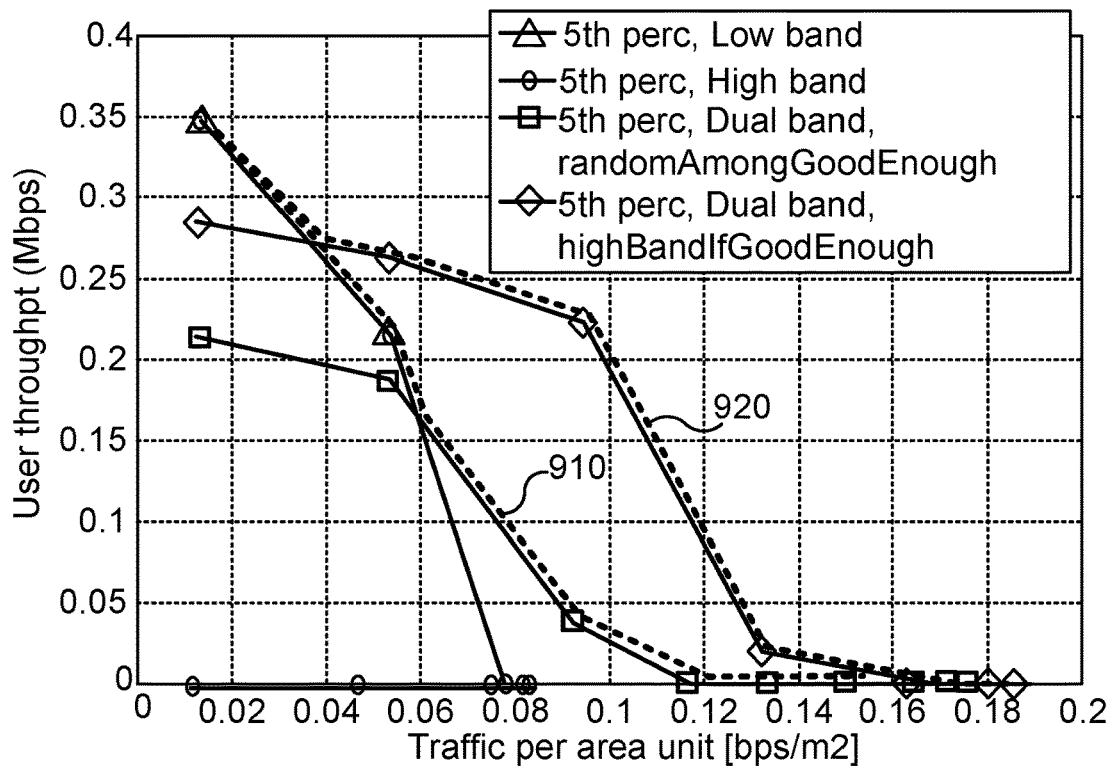
FIG. 9 schematically illustrates simulation results according to embodiments.

FIG. 9 shows simulation results of uplink performance with the group of low frequency bands 710a, 710b, 710c and the group of high frequency bands 720a, 720b, 720c combined in the same scenario as in FIG. 8. Performances of two of the herein disclosed embodiments are illustrated at 910 and 920, respectively. The plot at 910 represents the above disclosed embodiment of randomly select the group of frequency bands when the pathloss is low (i.e., below the second predetermined limit). The plot at 920 represents the above disclosed embodiment of selecting the group of high frequency bands 720a, 720b, 720c when the pathloss is low and the group of low frequency bands 710a, 710b, 710c when the pathloss is high (i.e., above the second predetermined limit). Commonly for these two embodiments is that a frequency in the group of low frequency bands 710a, 710b, 710c is always selected as PCell at low uplink loads, but as the uplink load increases the group of high frequency bands 720a, 720b, 720c is used for selected wireless devices 110a, 110b depending on their pathloss. The result is increased capacity and throughput at higher loads. For example, the maximum traffic is increased from 0.08 to 0.12 or 0.16, i.e. 50-100% higher.

Further, the solid lines marked by squares and diamonds in FIG. 9 show the performance when the uplink load of the group of low frequency bands 710a, 710b, 710c is not considered; hence only the second predetermined limit is considered when selecting the frequency location of the PCell. There is degradation in performance compared to using a frequency in the group of low frequency bands 710a, 710b, 710c as PCell at low loads. One reason is that many wireless devices 110a, 110b have limited power/SNR and therefore cannot make use of frequencies in the group of high frequency bands 720a, 720b, 720c. This behavior is dominant at low uplink loads.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining frequency location of a primary cell, PCell, for a wireless device in a carrier aggregation supported communications network having access to a group of low frequency bands and a group of high frequency bands, the method being performed by a network node, the method comprising:
acquiring an uplink load level for the group of low frequency bands;
acquiring a pathloss level between a wireless device served by the communications network and the network node;
selecting, from the acquired uplink load level and pathloss level, which one of the group of low frequency bands and the group of high frequency bands to place the frequency location of the PCell for the wireless device, wherein the frequency location of the PCell is selected to be in the group of low frequency bands if the uplink load level for the group of low frequency bands is below a first predetermined level, and, wherein the frequency location of the PCell is selected based on the pathloss level but no longer on the uplink load level if the uplink load level for the group of low frequency bands is above the first predetermined level, and wherein the group of low frequency bands is lower than 1 GHz and the group of high frequency bands are equal to or higher than 1 GHz.

2. The method according to claim 1, wherein the first predetermined level is based on uplink performance statistics in the communications network.

3. The method according to claim 1, wherein the frequency location of the PCell is selected to be in the group of low frequency bands if the pathloss level is above a second predetermined level.

4. The method according to claim 3, wherein the second predetermined level is based on uplink performance statistics in the communications network.

5. The method according to claim 1, wherein the frequency location of the PCell is selected to be in the group of high frequency bands if the pathloss level is below a second predetermined level.

6. The method according to claim 1, wherein the frequency location of the PCell is randomly selected between the group of high frequency bands and the group of low frequency bands if the pathloss level is below a second predetermined level.

7. The method according to claim 1, wherein the uplink load level is determined based on uplink throughput statistics in the communications network.

8. The method according to claim 1, wherein the uplink load level represents an uplink interference level, an uplink resource utilization level, an uplink traffic throughput level, or any combination thereof.

9. The method according to claim 1, wherein the uplink load level represents number of available uplink radio resources in the group of low frequency bands that are occupied.

10. The method according to claim 1, wherein the uplink load level is for an uplink control channel, an uplink data channel used for transmission of acknowledgement messages, or any combination thereof.

11. The method according to claim 1, wherein the pathloss level is derived from uplink measurements, downlink measurements reports received from the wireless device, or any combination thereof.

12. The method according to claim 11, wherein the downlink measurements reports are part of a handover evaluation process of the wireless device.

13. The method according to claim 1, wherein the pathloss level is determined for the group of low frequency bands, the group of high frequency bands, or any combination thereof.

14. The method according to claim 1, further comprising:
acquiring a need for carrier aggregation for the wireless device, and wherein the uplink load level is acquired in response thereto.

15. The method according to claim 14, wherein the need represents amount of buffered data in the network node being higher than a third predetermined level, indication of the wireless device being in active mode, indication that the wireless device supports carrier aggregation, uplink performance being below a fourth predetermined level, or any combination thereof.

16. The method according to claim 1, wherein the group of frequency bands in which the frequency location of the PCell is placed is iteratively selected.

17. The method according to claim 1, wherein the selecting further comprises:
dividing the selected group of frequency bands in which the frequency location of the PCell has been placed into a further group of low frequency bands and a further group of high frequency bands; and
determining, from the acquired uplink load level and pathloss level, the frequency location of the PCell to be in either the further group of low frequency bands or the further group of high frequency bands.

18. The method according to claim 1, wherein selecting which of the group of low frequency bands and the group of high frequency bands to place the frequency location of the PCell is performed during ongoing carrier aggregation of the wireless device, or as part of setting up carrier aggregation for the wireless device.

19. The method according to claim 1, wherein the carrier aggregation supported communications network further comprises a group of mid frequency bands.

20. A network node for determining frequency location of a primary cell, PCell, for a wireless device in a carrier aggregation supported communications network having access to a group of low frequency bands and a group of high frequency bands, the network node comprising processing circuitry, the processing circuitry being configured to cause the network node to perform a set of operations causing the network node to:
acquire an uplink load level for the group of low frequency bands;
acquire a pathloss level between a wireless device served by the communications network and the network node; and
select, from the acquired uplink load level and pathloss level, which one of the group of low frequency bands and the group of high frequency bands to place the frequency location of the PCell for the wireless device; and further causing the network node to:

select the frequency location of the PCell to be in the group of low frequency bands if the uplink load level for the group of low frequency bands is below a first predetermined level; and select the frequency location of the PCell based on the pathloss level but no longer on the uplink load level if the uplink load level for the group of low frequency bands is above the first predetermined level, and wherein the group of low frequency bands is lower than 1 GHz and the group of high frequency bands are equal to or higher than 1 GHz.

21. The network node according to claim 20, further comprising a storage medium storing said set of operations, and wherein the processing circuitry is configured to retrieve said set of operations from the storage medium to cause the network node to perform said set of operations.

22. A non-transitory computer-readable medium storing a computer program for determining frequency location of a primary cell, PCell, for a wireless device in a carrier aggregation supported communications network having access to a group of low frequency bands and a group of high frequency bands, the computer program comprising computer code which, when run on processing circuitry of a network node, causes the network node to:

acquire an uplink load level for the group of low frequency bands;

acquire a pathloss level between a wireless device served by the communications network and the network node; and select, from the acquired uplink load level and pathloss level, which one of the group of low frequency bands and the group of high frequency bands to place the frequency location of the PCell for the wireless device; and further causing the network node to:

select the frequency location of the PCell to be in the group of low frequency bands if the uplink load level for the group of low frequency bands is below a first predetermined level; and select the frequency location of the PCell based on the pathloss level but no longer on the uplink load level if the uplink load level for the group of low frequency bands is above the first predetermined level, and wherein the group of low frequency bands is lower than 1 GHz and the group of high frequency bands are equal to or higher than 1 GHz.

* * * * *